United States Patent
Crews

(10) Patent No.: US 9,587,156 B2
(45) Date of Patent: Mar. 7, 2017

(54) AGENTS FOR ENHANCED DEGRADATION OF CONTROLLED ELECTROLYTIC MATERIAL

(71) Applicant: James B. Crews, Willis, TX (US)

(72) Inventor: James B. Crews, Willis, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 109 days.

(21) Appl. No.: 14/468,950

(22) Filed: Aug. 26, 2014

(65) Prior Publication Data

US 2014/0367117 A1 Dec. 18, 2014

Related U.S. Application Data

(62) Division of application No. 13/294,246, filed on Nov. 11, 2011, now Pat. No. 8,967,275.

(51) Int. Cl.
| | |
|---|---|
| *E21B 29/02* | (2006.01) |
| *C09K 8/68* | (2006.01) |
| *C09K 8/00* | (2006.01) |
| *C09K 8/74* | (2006.01) |
| *E21B 29/00* | (2006.01) |
| *C09K 8/03* | (2006.01) |
| *C09K 8/86* | (2006.01) |

(52) U.S. Cl.
CPC ............... *C09K 8/00* (2013.01); *C09K 8/03* (2013.01); *C09K 8/74* (2013.01); *E21B 29/00* (2013.01); *E21B 29/02* (2013.01); *C09K 8/86* (2013.01)

(58) Field of Classification Search
CPC ............ C09K 8/68; E21B 29/00; E21B 29/02
See application file for complete search history.

(56) References Cited

U.S. PATENT DOCUMENTS

| | | | |
|---|---|---|---|
| 4,553,601 A | 11/1985 | Almond et al. | |
| 4,633,949 A | 1/1987 | Crowe | |
| 4,649,999 A | 3/1987 | Sandy et al. | |
| 4,830,766 A * | 5/1989 | Gallup | C02F 1/70 166/300 |
| 7,595,284 B2 | 9/2009 | Crews | |
| 2003/0150613 A1 | 8/2003 | Freiter | |

OTHER PUBLICATIONS

Chemogenesis, Redox Chemistry; [retrieved on Jun. 16, 2004]; retrieved from the Internet http://www.meta-synthesis.comm/webbook/15_redox.html, 9 pages.
Dissolvine Master the Elements, Akzo Nobel, "Redox Potential of Iron Chelates", Technical Leaflet 233, Dec. 2003, 2 pages.
Garry R. Buettner et al., "Catalytic Metals, Ascorbate and Free Radicals: Combinations to Avoid", Radiation Research 145, 1996, pp. 532-541.
Internet Journal of Science, [retrieved on Jan. 19, 2005]; retrieved from the Internet, http://www.netsci-joumal.com/97v4197014/vitc5.html, "Vitamin C derivatives as antioxidant agents" 1997-2001 Emedia Science Ltd, 7 pages.
Suzanne E. Stait et al., "The effects of ascorbate and dehydroascorbate on the oxidation of low-density lipoprotein", Biochem J. (1996) 320, pp. 373-381.
Written Opinion and International Search Report, Date of Mailing Mar. 26, 2013, International Appln No. PCT/US2012/061104, Korean Intellectual Property Office, Written Opinion 6 pages, International Search Report 2 pages.

* cited by examiner

*Primary Examiner* — Zakiya W Bates
(74) *Attorney, Agent, or Firm* — Cantor Colburn LLP

(57) ABSTRACT

A method for degrading a downhole article includes exposing the downhole article comprising a controlled electrolytic material to a composition that comprises a reducing agent. The method also includes contacting the downhole article with the reducing agent to degrade the downhole article. Additionally, a composition for degrading a downhole article includes water, chelant, metal ions, and a reducing agent that includes ascorbic acid, erythorbic acid, a derivative thereof, a salt thereof, or a combination thereof.

14 Claims, No Drawings

AGENTS FOR ENHANCED DEGRADATION OF CONTROLLED ELECTROLYTIC MATERIAL

CROSS REFERENCE TO RELATED APPLICATIONS

This application is a divisional of U.S. application Ser. No. 13/294,246 filed Nov. 11, 2011, now U.S. Pat. No 8,967,275, the disclosure of which is incorporated by reference herein in its entirety.

BACKGROUND

Downhole operations, including oil and natural gas wells, often utilize borehole components or tools that, due to their function, are only required to have limited service lives that are considerably less than the service life of the well. After a component or tool service function is complete, the downhole component or tool must be removed or disposed of in order to recover the original size of the fluid pathway for use, including hydrocarbon production, $CO_2$ sequestration, etc. Disposal of components or tools has conventionally been done by milling or drilling the component or tool out of the borehole, which is generally a time consuming and expensive operation.

In order to eliminate the need for the milling or drilling operation, the removal of components or tools by dissolution of degradable material using various borehole fluids has been proposed. The degradable materials that have been proposed include certain degradable metal alloys formed from reactive metals, such as aluminum, together with other alloy constituents, such as gallium, indium, bismuth, tin, and mixtures and combinations thereof. These materials may be formed by melting powders of the constituents and then solidifying the melt to form the alloy. They may also be formed using powder metallurgy by pressing, compacting, sintering and the like a powder mixture of a reactive metal and other alloy constituent in various amounts. To degrade the metal alloys, and thus effectively remove the component or tool from the borehole, strong mineral acids or brine have been used. However, the corrosion rate of mineral acids may be too fast while the corrosion rate of brine may be too slow under downhole conditions.

Advances that avoid the above noted problems would be well-received in the art.

BRIEF DESCRIPTION

Disclosed herein is a method for degrading a downhole article. The method comprises exposing the downhole article comprising a controlled electrolytic material to a composition comprising: water; and a reducing agent of formula 1; and contacting the downhole article with the reducing agent to degrade the downhole article,

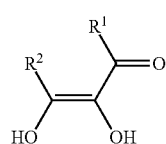

Formula 1 wherein R1 and R2 are:
independently a functional group from R3; or
a ring formed by joining R1 and R2, which are independently a group from R4, wherein R3 is a functional group selected from hydrogen, hydroxyl, alkyl, alkoxy, fluoroalkyl, cycloalkyl, heterocloalkyl, cycloalkyloxy, aryl, aralkyl, aryloxy, aralkyloxy, heteroaryl, heteroaralkyl, alkenyl, alkynyl, $NH_2$, amine, alkyleneamine, aryleneamine, or alkenyleneamine, and R4 is a group selected from a single bond, oxygen (—O—), alkylene, alkyleneoxy, fluoroalkylene, cycloalkylene, heterocycloalkylene, arylene, aralkylene, aryleneoxy, heteroarylene, heteroaralkylene, alkenylene, alkynylene, amide, or any of the foregoing groups substituted by a functional group from R3.

Also disclosed herein is a method for degrading a downhole article, comprising: introducing a composition comprising a reducing agent of formula 2 into a borehole; and removing, by the reducing agent, a metal from the downhole article to degrade the downhole article,

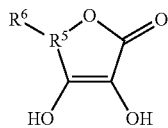

Formula 2 wherein R5 is a group selected from a single bond, alkylene, alkyleneoxy, fluoroalkylene, cycloalkylene, heterocycloalkylene, arylene, aralkylene, aryleneoxy, heteroarylene, heteroaralkylene, alkenylene, alkynylene, or amide, and R6 is a functional group selected from hydrogen, hydroxyl, alkyl, alkoxy, fluoroalkyl, cycloalkyl, heterocloalkyl, cycloalkyloxy, aryl, aralkyl, aryloxy, aralkyloxy, heteroaryl, heteroaralkyl, alkenyl, alkynyl, $NH_2$, amine, alkyleneamine, aryleneamine, or alkenyleneamine.

Further disclosed herein is a composition for degrading a downhole article, comprising: water; a reducing agent comprising ascorbic acid, erythorbic acid, a derivative thereof, a salt thereof, or a combination thereof.

DETAILED DESCRIPTION

A detailed description of one or more embodiments of the disclosed method is presented herein by way of exemplification and not limitation.

The inventor has discovered that a reducing agent such as a reducing agent of formula 1 (described below) selectively and controllably degrades a downhole article containing certain electrolytic materials so that the downhole article will no longer substantially block or impede a passage or fluid flow in a borehole. Moreover, such degradation by the reducing agent can expose a surface or feature of a downhole article that was previously covered or protected by a material including an electrolytic material, and the newly exposed surface or feature can provide a benefit for operating in the downhole environment. Further, the inventor has discovered that such degradation of the downhole article can be controlled over time. The reducing agent is environmentally benign and is corrosive to electrolytic materials over a large temperature range where other compounds are either too corrosive (for example, mineral acids such as hydrochloric acid) or not corrosive enough (for example, brine solutions). These reducing agents bridge the gap between the corrosion strengths of strong and mild corrosives, such as hydrochloric acid and sodium chloride aqueous solutions.

According to an embodiment, a degradable downhole tool, such as a packer, ball seat, frac plug, or proppant includes an electrolytic material, which dissolves in a corrosive environment, such as under reducing conditions. Such electrolytic material is referred to herein as controlled electrolytic material (CEM). The controlled electrolytic material, which is discussed further below, can be an electrolytic metal such as described in U.S. Patent Application Publication No. 2013/0029886, the content of which is incorporated herein by reference in its entirety. Removal of the electrolytic material from the downhole article causes degradation of the downhole article.

In an embodiment, a method for degrading a downhole CEM article includes exposing the downhole CEM article to a composition that comprises a reducing agent and contacting the downhole CEM article with the reducing agent to degrade the downhole CEM article. In an embodiment, the reducing agent is represented by formula 1

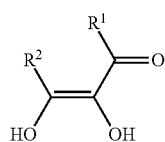

Formula 1 wherein $R^1$ and $R^2$ are:
independently a functional group from $R^3$; or
a ring formed by joining $R^1$ and $R^2$, which are independently a group from $R^4$,
wherein $R^3$ is a functional group selected from hydrogen, hydroxyl, alkyl, alkoxy, fluoroalkyl, cycloalkyl, heterocycloalkyl, cycloalkyloxy, aryl, aralkyl, aryloxy, aralkyloxy, heteroaryl, heteroaralkyl, alkenyl, alkynyl, $NH_2$, amine, alkyleneamine, aryleneamine, or alkenyleneamine, and
$R^4$ is a group selected from a single bond, oxygen (—O—), alkylene, alkyleneoxy, fluoroalkylene, cycloalkylene, heterocycloalkylene, arylene, aralkylene, aryleneoxy, heteroarylene, heteroaralkylene, alkenylene, alkynylene, amide, or any of the foregoing groups substituted by a functional group from $R^3$.

In an embodiment, the reducing agent includes $R^3$ selected from hydrogen, hydroxyl, alkyl, alkoxy, and amine and R4 selected from a single bond, oxygen (—O—), alkylene, alkyleneoxy, alkenylene, or any of the foregoing R4 groups substituted by a functional group from $R^3$ appearing in this sentence.

Examples of the reducing agent include tartonaldehyde; reductic acid; ascorbic acid; erythorbic acid; 3,4-dihydroxy-2H-oxet-2-one; 3,4-dihydroxyfuran-2(5H)-one; 3,4-dihydroxy-5-(hydroxymethyl)furan-2(5H)-one; 5-(1,2-dihydroxyethyl)-3,4-dihydroxyfuran-2(5H)-one; (2Z)-2,3,4-trihydroxybut-2-enal; (2Z)-2,3,4,5-tetrahydroxypent-2-enal; (2Z)-2,3,4,5-tetrahydroxypent-2-enal; (2Z)-2,3,4,5,6-pentahydroxyhex-2-enal; (2Z)-2,3,4,5,6,7-hexahydroxyhept-2-enal; 2,3-dihydroxycycloprop-2-en-1-one; 2,3,4-trihydroxycyclobut-2-en-1-one; 2,3,4,5-tetrahydroxycyclopent-2-en-1-one; 3,4,5-trihydroxy-5,6-dihydro-2H-pyran-2-one; 3,4,5-trihydroxyfuran-2(5H)-one; 3,4-dihydroxy-5-methylfuran-2(5H)-one; 3,4-dihydroxy-5-(hydroxymethyl)furan-2(5H)-one; 3,4-dihydroxy-5-(2-hydroxyethyl)furan-2(5H)-one; 3,4,5-trihydroxy-6-methyl-5,6-dihydro-2H-pyran-2-one; 3,4,5-trihydroxy-6-(hydroxymethyl)-5,6-dihydro-2H-pyran-2-one; 6-(1,2-dihydroxyethyl)-3,4,5-trihydroxy-5,6-dihydro-2H-pyran-2-one; 3,4,5,6-tetrahydroxy-5,6-dihydro-2H-pyran-2-one; 3,4,5-trihydroxy-6-(1-hydroxyethyl)-5,6-dihydro-2H-pyran-2-one; and 3,4-dihydroxy-5-[(hydroxymethyl)amino]furan-2(5H)-one. Although the Z isomer is recited in this list, it should be understood by one skilled in the art that both Z and E isomers can be used. Furthermore, the reducing agent includes all tautomeric forms applicable thereto.

In an embodiment, the reducing agent is ascorbic acid, ascorbate, erythorbic acid, erythorbate, a derivative thereof, a salt thereof, or a combination thereof. Derivatives of the reducing agent, for example, ascorbic acid or erythorbic acid include fatty acid esters thereof. Such fatty acid esters can be, for example ascorbyl palmitate or ascorbyl stearate. Salts of the reducing agent or derivative thereof include, for example, a cation selected from sodium, potassium, magnesium, calcium, zinc, ammonium, or a combination thereof. Examples of salts of the reducing agent include sodium ascorbate, potassium erythorbate, and the like.

Without wishing to be bound by theory, it is believed that the reducing agent, for example, ascorbic acid, is oxidized with concomitant reduction of a metal (described below) in the downhole article. In the oxidation of the reducing agent, for example, ascorbic acid, the ascorbic acid is converted to monodehydroascorbate and eventually dehydroascorbate.

According to an embodiment, the reducing agent includes a fatty acid group. The hydrocarbon chain in the fatty acid portion of such compounds can be saturated or unsaturated as well as substituted or unsubstituted. Examples of reducing agents containing a fatty acid include ascorbyl stearate and ascorbyl palmitate.

The fatty acid portion of the reducing agent includes a fatty acid portion derived from a C4-C30 fatty acid, specifically a C4-C22 fatty acid, and more specifically a C4-C12 fatty acid. Example saturated fatty acids useful in the reducing agent include caprylic acid, capric acid, lauric acid, myristic acid, palmitic acid, stearic acid, arachidic acid, behenic acid, lignoceric acid, cerotic acid. Example unsaturated fatty acids useful in the reducing agents include myristoleic acid, palmitoleic acid, sapienic acid, oleic acid, elaidic acid, vaccenic acid, linoleic acid, linoelaidic acid, α-linolenic acid, arachidonic acid, eicosapentaenoic acid, erucic acid, and docosahexaenoic acid. Reducing agents that include a fatty acid portion are also referred herein as fatty acid reducing agents.

In a further embodiment, the composition, in addition to the reducing agent, includes water and can also include metal ions. Without wishing to be bound by theory, it is believed that the metal ions enhance the reducing function of the reducing agent. The mechanism by which this occurs may be catalytic in nature. The reducing agent of formula 1 has two hydroxyls in an enediol substructure. These two hydroxyls are oxidized such that carbonyl groups are formed during the reduction of a metal in the downhole article. During the oxidation of the reducing agent, the metal ions may increase the formation rate of a radical or oxide ion at one or both of the two hydroxyls of the enediol.

In an embodiment, the metal ions in the composition are an element selected from Group 1, Group 2, Group 6, Group 7, Group 8, Group 9, Group 10, Group 11, Group 12, Group 13 of the periodic table, or a combination thereof. Examples of the metal ions in the composition include $Fe^{2+}$, $Fe^{3+}$, $Co^{3+}$, $Mn^{2+}$, $Ni^{2+}$, $Cu^{2+}$, $Cr^{3+}$, $Cr^{6+}$, $Cr^{2+}$, $Zn^{2+}$, or a combination thereof. The metal ions can be present in the composition from about 0.001 weight percent (wt. %) to about 1 wt. %, specifically about 0.01 wt. % to about 0.25 wt. %, and more specifically about 0.01 wt. % to about 0.1 wt. %, based on the weight of the composition.

The downhole article comprises a metal selected from Group 2, Group 3, Group 4, Group 5, Group 6, Group 7, Group 8, Group 9, Group 10, Group 11, Group 12, Group 13, lanthanoid series, actinoid series of the periodic table, or a combination thereof. In a non-limiting embodiment, the metal is aluminum (Al), cadmium (Cd), calcium (Ca), californium (CO, cobalt (Co), copper (Cu), chromium (Cr), gallium (Ga), indium (In), iron (Fe), magnesium (Mg), manganese (Mn), molybdenum (Mo), nickel (Ni), palladium (Pd), tin (Sn), titanium (Ti), tungsten (W), silicon (Si), silver (Ag), yttrium (Y), zinc (Zn), zirconium (Zr), an alloy thereof, or a combination thereof. It is believed that these metals can be used in a downhole environment and can be corroded by the reducing agent. Also, such metals can be stable in the downhole environment for extended periods of time (for example a week to a number of years), or the metal can be corroded at a nominal rate that does not adversely affect the structure or functionality of the downhole article until exposure to the reducing agent.

Additionally, the downhole article can include other corrodible metals, metal oxides, composites, soluble glasses, and the like. Useful corrodible materials dissolve under an aqueous condition. According to an embodiment, alloying or trace elements can be included in varying amounts to adjust the corrosion rate of the metal. For example, four of these elements (cadmium, calcium, silver, and zinc) have to mild-to-moderate accelerating effects on corrosion rates, whereas four others (copper, cobalt, iron, and nickel) have a still greater effect on corrosion. Commercial magnesium alloys, which include different combinations of the above alloying elements, can achieve different corrosion rates and include (although not limited to), for example, those alloyed with aluminum, strontium, and manganese such as AJ62, AJ50x, AJ51x, and AJ52x alloys, and those alloyed with aluminum, zinc, and manganese such as AZ91A-E alloys.

It will be appreciated that alloys having corrosion rates greater than those of the above exemplary alloys are contemplated as being useful herein. For example, nickel has been found to be useful in decreasing the corrosion resistance (i.e., increasing the corrosion rate) of magnesium alloys when included in small amounts (i.e., less than 1% by weight). In an embodiment, the nickel content of a magnesium alloy is less than or equal to about 0.5 wt. %, specifically less than or equal to about 0.4 wt. %, and more specifically less than or equal to about 0.3 wt. %, to provide a useful corrosion rate for the corrodible downhole article. In an exemplary embodiment, magnesium particles are alloyed with about 0.25 wt. % Ni. Similar ranges are applicable to other metal alloys disclosed herein.

The above alloys are useful as a metal in the downhole article and are formed into the desired shape and size by casting, forging, machining, or a combination thereof. Alternatively, powders of the metal or the metal alloy are useful for forming part of the downhole article. Such metal or metal alloy powders can have a particle size of from about 50 micrometers (μm) to about 150 μm, and more specifically about 60 μm to about 140 μm. The powder can be further coated using a method such as chemical vapor deposition, anodization or the like, or admixed by physical method such cryo-milling, ball milling, or the like, with a metal or metal oxide such as Al, Ni, W, Co, Cu, Fe, oxides of one of these metals, or the like. Such coated metal powders are examples of controlled electrolytic material (CEM). The CEM material can be molded or compressed into the desired shape by, for example, cold compression using an isostatic press at about 40 kilopound per square inch (kpsi) to about 80 kpsi (about 275 megapascal (MPa) to about 550 MPa), followed by forging or sintering and machining, to provide a desired shape and dimension.

It will be understood that the metal, including CEM, will thus have any corrosion rate necessary to achieve the desired performance of the downhole article. In an embodiment, the metal (e.g., CEM material) used in the downhole article has a corrosion rate of about 0.1 mg/cm$^2$/hour to about 20 mg/cm$^2$/hour, specifically about 1 mg/cm$^2$/hour to about 15 mg/cm$^2$/hour in, for example, an aqueous 3 wt. % KCl solution (based on the weight of the solution) at 200° F. (93° C.) and even higher in the reducing agents disclosed herein. The corrosion rate can be adapted to be below these ranges for a particular application of the downhole article.

In an embodiment, degrading the downhole article comprises reducing the metal in the downhole article by the reducing agent or a product of the reducing agent. Particularly, the reducing agent is ascorbic acid, ascorbate, erythorbic acid, erythorbate, a derivate thereof, a salt thereof, or a combination thereof. Reducing the metal in the downhole article comprises oxidizing the reducing agent.

According to an embodiment, the composition contains a chelant (e.g., an aminocarboxylic acid) such that the method also includes chelating, by the aminocarboxylic acid, metal from the downhole article that was reduced by the reducing agent. In a further embodiment, degrading the downhole article comprises leaching the metal from the downhole article. The method can also include chelating, by the aminocarboxylic acid, the metal that was leached from the downhole article.

The amount of the reducing agent in the composition is that amount required to sufficiently reduce the metal in the downhole article, thus degrading the downhole article. Factors including the exposure time, the concentration of other ingredients in the composition, volumetric flow rate at the downhole article, and the formation temperature as well as other considerations known to those skilled in the art may guide the decision of the amount of the reducing agent to include in the composition. In an embodiment, the reducing agent is present in the composition in an amount from about 0.1 weight percent (wt. %) to about 40 wt. %, specifically from about 0.2 wt. % to about 30 wt. %, and more specifically about 0.5 wt. % to about 20 wt. %, based on the weight of the composition.

As discussed above, the composition can include an aminocarboxylic acid. In an embodiment, degrading the downhole article comprises leaching the metal from the downhole article by the aminocarboxylic acid. The aminocarboxylic acid can also chelate the leached metal from the downhole article. Additionally, the aminocarboxylic acid can stabilize the metal ions, if present, in the composition by chelating the metal ions. Further, the aminocarboxylic acid can release the metal ions to interact with the reducing agent in order to enhance the reducing power of the reducing agent. Releasing the metal ions by the aminocarboxylic acid can be modulated by a number of factors including, pH, temperature, time, and the like.

In an embodiment, the aminocarboxylic acid is a C1 to C35 and N1 to N10 aminocarboxylic acid. Examples of the aminocarboxylic acid include diethylenetriaminepentaacetic acid (DTPA); ethylenediamine-N,N'-bis(2-hydroxyphenylacetic acid) (EDDHA); ethylenediaminetetraacetic acid (EDTA); ethylene-bis(oxyethylenenitrilo)tetraacetic acid (EGTA); N,N'-di(2-hydroxybenzyl)ethylenediamine-N,N'-diacetic acid (HBED); (hydroxyethyl)ethylenediaminetriacetic acid (HEDTA); iminodiacetic acid (IDA); nitrilotriacetic acid (NTA); a derivative thereof; a salt thereof; or a combination thereof. Salts of the aminocarboxylic acid include, for example, calcium disodium EDTA, diammonium EDTA, dipotassium EDTA, disodium EDTA, triethanolamine salt of EDTA (TEA-EDTA), tetrasodium EDTA, tripotassium EDTA, trisodium EDTA, and trisodium HEDTA.

In a specific embodiment, the aminocarboxylic acid is EDTA, Na$_4$EDTA, (NH$_4$)H$_2$EDTA, NTA, Na$_3$NTA, HEDTA, Na$_3$HEDTA, DTPA, K$_5$DTPA, a derivative thereof, or a combination thereof and the like.

The amount of aminocarboxylic acid used is that amount required to leach and/or chelate the metal in the downhole article. As with the reducing agent, the amount of the aminocarboxylic acid used depends on factors such as the injection time desired, concentration of other ingredients in the composition, volumetric flow rate at the downhole article, formation temperature, and other factors. The aminocarboxylic acid is preferably present in the composition in an amount from about 0.01 wt. % to about 1 wt. %, specifically from about 0.02 wt. % to about 0.5 wt. %, and more specifically about 0.05 wt. % to about 0.3 wt. %, based on the weight of the composition.

In an embodiment, the aminocarboxylic acid has a leaching rate of the metal in the downhole article from about 0.1 mg/hour to about 2000 mg/hour, specifically about 1 mg/hour to about 1000 mg/hour, and more specifically about 10 mg/hour to about 500 mg/hour.

In some embodiments, the composition is substantially free of acid except for the reducing agent, an acid produced from the reducing agent, or a combination thereof.

According to another embodiment, a method for degrading a downhole article comprises introducing a composition comprising a reducing agent into a borehole and removing, by the reducing agent, a metal from the downhole article to degrade the downhole article. In an embodiment, the reducing agent is given by formula 1. Alternatively, the reducing agent is given by formula 2:

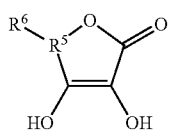

Formula 2 wherein R5 is a group selected from a single bond, alkylene, alkyleneoxy, fluoroalkylene, cycloalkylene, heterocycloalkylene, arylene, aralkylene, aryleneoxy, heteroarylene, heteroaralkylene, alkenylene, alkynylene, or amide, and R6 is a functional group selected from hydrogen, hydroxyl, alkyl, alkoxy, fluoroalkyl, cycloalkyl, heterocycloalkyl, cycloalkyloxy, aryl, aralkyl, aryloxy, aralkyloxy, heteroaryl, heteroaralkyl, alkenyl, alkynyl, NH$_2$, amine, alkyleneamine, aryleneamine, or alkenyleneamine. The composition can also include metal ions as described above.

Examples of the reducing agent include ascorbic acid, ascorbate, erythorbic acid, erythorbate, a derivative thereof, salt thereof, or a combination thereof and those examples discussed above with regard to formula 1, as applicable.

The method further comprises oxidizing the reducing agent, wherein removing the metal comprises reducing the metal in the downhole article by the reducing agent. In another embodiment, the method further comprises adjusting the pH of the borehole proximate to the downhole article to a pH from about 2 to about 8, more specifically about 3 to about 7, and more specifically about.4 to about 6. The pH can be adjusted by selecting the amount of reducing agent in the composition. According to an embodiment, removing the metal from the downhole article comprises leaching the metal from the downhole article by the aminocarboxylic acid and/or by the reducing agent; and chelating the metal by the aminocarboxylic acid.

In an embodiment, the composition described above includes water, salt, optionally surfactant, optionally solvent, or a combination thereof. Additionally, the composition can contain a chelant and metal ions.

In an embodiment, the composition includes water and/or brine. The selection of the water and salinity of the brine can depend on, for example, a desired density for the composition. In an embodiment, the water and/or brine is present in the composition in an amount from about 1 wt. % to about 99 wt. %, specifically about 10 wt. % to about 90 wt. %, and more specifically about 20 wt. % to about 80 wt. %.

Brine can be included in the foregoing compositions to modify the density of the composition as well as moderate the corrosion rate of the metal in the downhole article. The brine can be, for example, seawater, produced water, completion brine, or a combination thereof. The properties of the brine can depend on the identity and components of the brine. Seawater, as an example, contains numerous constituents such as sulfate, bromine, and trace metals, beyond typical halide-containing salts. On the other hand, produced water can be water extracted from a production reservoir (e.g., hydrocarbon reservoir), produced from the ground. Produced water is also referred to as reservoir brine and often contains many components such as barium, strontium, and heavy metals. In addition to the naturally occurring brines (seawater and produced water), completion brine can be synthesized from fresh water by addition of various salts such as NaCl, CaCl$_2$, or KCl to increase the density of the brine, such as 10.6 pounds per gallon of CaCl$_2$ brine. Completion brines typically provide a hydrostatic pressure optimized to counter the reservoir pressures downhole. The above brines can be modified to include an additional salt. In an embodiment, the additional salt included in the brine is NaCl, KCl, NaBr, MgCl$_2$, CaCl$_2$, CaBr$_2$, ZnBr$_2$, NH$_4$Cl, sodium formate, cesium formate, and the like. The salt can be present in the brine in an amount from about 0.5 wt. % to about 50 wt. %, specifically about 1 wt. % to about 40 wt. %, and more specifically about 1 wt. % to about 25 wt. %, based on the weight of the composition.

The surfactant can be anionic, cationic, zwitterionic, or non-ionic. The surfactant can be present in the composition in an amount from about 0.05 wt. % to about 50 wt. %, specifically about 0.1 wt. % to about 40 wt. %, and more specifically about 1 wt. % to about 25 wt. %, based on the weight of the composition.

The surfactant, among other uses, can solubilize the fatty acid reducing agent in an aqueous environment. Examples of a cationic surfactant include primary to tertiary alkylamine salts such as, for example, monostearylammonium chloride, distearylammonium chloride, tristearylammonium chloride; quaternary alkylammonium salts such as, for example, monostearyltrimethylammonium chloride, distearyldimethylammonium chloride, stearyldimethylbenzylammonium chloride, monostearyl-bis(polyethoxy)methylammonium chloride; alkylpyridinium salts such as, for example, N-cetylpyridinium chloride, N-stearylpyridinium chloride; N,N-dialkylmorpholinium salts; fatty acid amide salts such as, for example, polyethylene polyamine; and the like.

Examples of an anionic surfactant include anionic surfactants having a carboxyl group such as sodium salt of alkylcarboxylic acid, potassium salt of alkylcarboxylic acid, ammonium salt of alkylcarboxylic acid, sodium salt of alkylbenzenecarboxylic acid, potassium salt of alkylbenzenecarboxylic acid, ammonium salt of alkylbenzenecarboxylic acid, sodium salt of polyoxyalkylene alkyl ether carboxylic acid, potassium salt of polyoxyalkylene alkyl ether carboxylic acid, ammonium salt of polyoxyalkylene alkyl ether carboxylic acid, sodium salt of N-acylsarcosine acid, potassium salt of N-acylsarcosine acid, ammonium salt of N-acylsarcosine acid, sodium salt of N-acylglutamic acid, potassium salt of N-acylglutamic acid, ammonium salt of N-acylglutamic acid; anionic surfactants having a sulfonic acid group; anionic surfactants having a phosphonic acid; and the like.

Examples of a nonionic surfactant include polyoxyethylene alkyl ethers such as polyoxyethylene stearyl ether; polyoxyethylene alkylene ethers such as polyoxyethylene oleyl ether; polyoxyalkylene alkylphenyl ethers such as polyoxyethylene nonylphenyl ether; polyoxyalkylene glycols such as polyoxypropylene polyoxyethylene glycol; polyoxyethylene monoalkylates such as polyoxyethylene monostearate; bispolyoxyethylene alkylamines such as bispolyoxyethylene stearylamine; bispolyoxyethylene alkylamides such as bispolyoxyethylene stearylamide; alkylamine oxides such as N,N-dimethylalkylamine oxide; and the like.

The solvent is not particularly limited as long as the reducing agent is miscible therein to an appreciable extent. In an embodiment, the solvent can contain oxygen and be, for example, an alcohol, glycol, ether, pyrrolidone, and the like. The solvent can be present in the composition in an amount from about 0.05 wt. % to about 90 wt. %, specifically about 0.1 wt. % to about 80 wt. %, and more specifically about 1 wt. % to about 50 wt. %, based on the weight of the composition.

In a specific embodiment, the aqueous composition includes about 20 wt. % sodium ascorbate, based on the weight of the composition. In another embodiment, the composition includes about 0.5 wt. % diammonium dihydrogen EDTA and about 15% sodium ascorbate, based on the weight of the composition. Alternatively, the composition includes about 2 wt. % KCl, 0.1% diammonium dihydrogen EDTA, and about 10 wt. % sodium ascorbate, based on the weight of the composition. Alternatively, the composition includes about 0.02 wt. % ferrous chloride, 0.1 wt. % diammonium dihydrogen EDTA, and about 10 wt. % sodium ascorbate, based on the weight of the composition. Alternatively, the composition includes about 0.01 wt. % ferrous chloride, 0.05 wt. % cupric chloride, 0.25 wt. % diammonium dihydrogen EDTA, and about 10 wt. % sodium ascorbate, based on the weight of the composition.

In yet another embodiment, a downhole maintenance system comprises a composition comprising a reducing agent of formula 1 or formula 2 to degrade a downhole article. The downhole article comprises a metal as described above, an alloy thereof, or a combination thereof. Here, the reducing agent reduces the metal to degrade the downhole article. Non-limiting examples of the metal are magnesium, nickel, iron, aluminum, molybdenum, manganese, tungsten, zinc, zirconium, an alloy thereof, or a combination thereof. Also, as described above, the reducing agent can be ascorbic acid, ascorbate, erythorbic acid, erythorbate, a derivative thereof, a salt thereof, or a combination thereof.

In addition to the components discussed above, the composition can include an additive. Examples of the additive include mineral acid, additional organic acid, biocide, breaker, clay stabilizer, corrosion inhibitor, crosslinker, friction reducer, gelling agent, iron control agent, scale inhibitor, additional surfactant, or a combination thereof. Such additives are thought to, for example, facilitate entry into rock formations, kill bacteria and reduce risk of fouling, facilitate proppant entry, stabilize clay, provide well maintenance, facilitate proppant entry, improve surface pressure, provide proppant placement, prevent precipitation, and reduce fluid tension of the composition. In an embodiment, the additive is hydrochloric acid, glutaraldehyde, 2,2-dibromo-3-nitrilopropionamide, peroxodisulfates, salt (for example, tetramethylammonium chloride), methanol, potassium hydroxide, sodium acrylate, polyacrylamide, guar gum, citric acid, thioglycolic acid, ethylene glycol, polyacrylate, isopropanol, or a combination thereof.

In the above embodiments, the viscosity of the composition can be about 1 centipoise (cp) to about 1000 cp, specifically about 1 cp to about 100 cp, and more specifically about 1 cp to about 50 cp, as measured, for example, by a Brookfield viscometer. Additionally, in some embodiments, the time for degradation of the downhole article by the reducing agent is from about 0.1 hours to about 300 hours, specifically about 0.1 hours to about 100 hours, and more specifically about 0.1 hours to about 24 hours. Degradation of the downhole article according to embodiments discussed above can occur at a temperature of about 20° C. to about 200° C., specifically about 30° C. to about 175° C., and more specifically about 35° C. to about 150° C.

In some embodiments, the downhole article is a downhole tool. Examples of downhole tools include a packer element, a blowout preventer element, an O-ring, a T-ring, a gasket, a sucker rod seal, a pump shaft seal, a tube seal, a valve seal, a seal for an electrical component, an insulator for an electrical component, a seal for a drilling motor, a seal for a drilling bit, or other downhole elements. According to an embodiment, the downhole article is a component, for example, a ball or ball seat in a valve, flapper valve, or plunger in a solenoid. In yet another embodiment, the downhole article is a degradable material such as a cement or proppant, which either totally degrades to be removed or degrades partially to be left as a porous structural element. In a particular embodiment, the downhole article is a CEM-containing cement that is oxidized by a reducing agent to provide a porous media after removal of the oxidized metals, and the pores therein allow fluid to flow through the cement. Such downhole tools, components, and articles contain CEM material and are degradable with respect to the reducing agents herein.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed, but that the invention will include all embodiments falling within the scope of the claims. Also, in the drawings and the description, there have been disclosed exemplary embodiments, and, although specific terms may have been employed, they are unless otherwise stated used in a generic and descriptive sense only and not for purposes of limitation, the scope of the invention therefore not being so limited.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorant). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A method for degrading a downhole article, comprising:
    introducing a composition comprising a reducing agent of formula 2 into a borehole;
    contacting the downhole article with the reducing agent; and
    removing, by the reducing agent, a metal from the downhole article to degrade the downhole article,

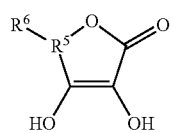

Formula 2 wherein $R^5$ is a group selected from a single bond, alkylene, alkyleneoxy, fluoroalkylene, cycloalkylene, heterocycloalkylene, arylene, aralkylene, aryleneoxy, heteroarylene, heteroaralkylene, alkenylene, alkynylene, or amide, and
   $R^6$ is a functional group selected from hydrogen, hydroxyl, alkyl, alkoxy, fluoroalkyl, cycloalkyl, heterocycloalkyl, cycloalkyloxy, aryl, aralkyl, aryloxy, aralkyloxy, heteroaryl, heteroaralkyl, alkenyl, alkynyl, $NH_2$, amine, alkyleneamine, aryleneamine, or alkenyleneamine.

2. The method of claim 1, wherein the metal is selected from aluminum, calcium, californium, cobalt, copper, chromium, gallium, indium, iron, magnesium, manganese, molybdenum, nickel, palladium, tin, titanium, tungsten, silicon, yttrium, zinc, or a combination thereof.

3. The method of claim 1, wherein removing the metal from the downhole article comprises reducing the metal by the reducing agent.

4. The method of claim 1, wherein the composition further comprises a metal ion.

5. The method of claim 4, wherein the metal ions comprise an element selected from Group 1, Group 2, Group 8, Group 9, Group 10, Group 11, Group 12 of the periodic table, or a combination thereof.

6. The method of claim 5, wherein the metal ions are $Fe^{2+}$, $Fe^{3+}$, $Co^{3+}$, $Mn^{2+}$, $Ni^{2+}$, $Cu^+$, $Cu^{2+}$, $Cr^{3+}$, $Cr^{2+}$, $Zn^{2+}$, or a combination thereof.

7. The method of claim 4, wherein the metal ions are present in the composition from about 0.001 wt. % to about 1 wt. % based on the weight of the composition.

8. The method of claim 1, wherein the composition further comprises brine.

9. The method of claim 8, wherein the brine is seawater, produced water, completion brine, or a combination thereof.

10. The method of claim 8, wherein a salt is present in the brine in an amount from about 0.5 wt. % to about 50 wt. % based on the weight of the composition.

11. The method of claim 1, further comprising adjusting, with the reducing agent, the pH of the borehole proximate to the downhole article to a pH of about 4 to about 8.

12. The method of claim 1, wherein downhole article is a packer element, a blowout preventer element, an O-ring, a T-ring, a gasket, a sucker rod seal, a pump shaft seal, a tube seal, a valve seal, a seal for an electrical component, an insulator for an electrical component, a seal for a drilling motor, a seal for a drilling bit, a ball or ball seat in a valve, a flapper valve, a plunger in a solenoid, degradable cement, or degradable proppant.

13. A composition for degrading a downhole article, comprising:
    water;
    a reducing agent comprising ascorbic acid, erythorbic acid, a derivative thereof, a salt thereof, or a combination thereof, and
    0.01 wt. % to 0.25 wt. % of a metal ion selected from $Co^{3+}$, $Mn^{2+}$, $Ni^{2+}$, $Cu^+$, $Cu^{2+}$, $Cr^{3+}$, $Cr^{2+}$, $Zn^{2+}$, or a combination thereof, based on the weight of the composition,
    wherein the composition is free of acid except for the reducing agent, an acid produced from the reducing agent, or a combination thereof.

14. The composition of claim 13, wherein the composition further comprises a non-ionic or cationic surfactant.

* * * * *